United States Patent
Xu et al.

(10) Patent No.: US 12,346,237 B2
(45) Date of Patent: Jul. 1, 2025

(54) CRASH BUG COMPONENT PREDICTION SYSTEM TO IDENTIFY COMPONENTS AS POTENTIAL BUG SOURCES

(71) Applicant: SAP SE, Walldorf (DE)

(72) Inventors: Yang Xu, Xi'an (CN); Yong Li, Xi'an (CN); Hyun Deok Choi, Seoul (KR); Qiao-Luan Xie, Xi'an (CN); Chao Liu, Xi'an (CN)

(73) Assignee: SAP SE, Walldorf (DE)

( * ) Notice: Subject to any disclaimer, the term of this patent is extended or adjusted under 35 U.S.C. 154(b) by 205 days.

(21) Appl. No.: 18/178,618

(22) Filed: Mar. 6, 2023

(65) Prior Publication Data
US 2024/0303179 A1    Sep. 12, 2024

(51) Int. Cl.
*G06F 8/70* (2018.01)
*G06F 8/77* (2018.01)
*G06F 11/362* (2025.01)
*G06F 11/3668* (2025.01)
*G06N 5/022* (2023.01)

(52) U.S. Cl.
CPC ............ *G06F 11/3636* (2013.01); *G06F 8/77* (2013.01); *G06F 11/3692* (2013.01); *G06N 5/022* (2013.01)

(58) Field of Classification Search
CPC ............... G06F 11/3636; G06F 11/366; G06F 11/3692; G06F 8/77; G06N 20/00; G06N 5/022
See application file for complete search history.

(56) References Cited

U.S. PATENT DOCUMENTS

| | | | |
|---|---|---|---|
| 11,734,156 B2 * | 8/2023 | Bansal | G06F 11/3636 717/131 |
| 2021/0248457 A1 * | 8/2021 | Odibat | G06N 3/045 |
| 2022/0108191 A1 | 4/2022 | Yang et al. | |
| 2023/0016199 A1 * | 1/2023 | Jividen | G06N 20/00 |
| 2023/0033084 A1 * | 2/2023 | A | G06N 3/045 |

OTHER PUBLICATIONS

U.S. Appl. No. 17/985,995, filed Nov. 14, 2022, Liu et al.

* cited by examiner

*Primary Examiner* — Hanh Thi-Minh Bui
(74) *Attorney, Agent, or Firm* — Fish & Richardson P.C.

(57) ABSTRACT

Methods, systems, and computer-readable storage media for receiving a crash report provided as a computer-readable file, providing a stack trace from the crash report, adding component information to the stack trace, for each component identified in the stack trace, determining a set of features, processing sets of features through a ML model to provide a prediction identifying a component as a bug component, and assigning the bug component for resolution through a crash management system.

17 Claims, 8 Drawing Sheets

| Stack ID | Function Name | Component | Component Position | Bug Component (Root Cause) | Label |
|---|---|---|---|---|---|
| cs1 | fc0.0 | C0 | 0 | C2 | 2 |
| | fc0.1 | | | | |
| | fc0.2 | | | | |
| | fc1.0 | C1 | 1 | | |
| | fc1.1 | | | | |
| | fc1.2 | | | | |
| | fc2.0 | C2 | 2 | | |
| | fc2.1 | | | | |
| | fc2.2 | | | | |

| Stack ID | Function Name | Component | Component Position | Bug Component (Root Cause) | Label |
|---|---|---|---|---|---|
| cs1 | fc0.0 | C0 | 0 | C2 | 2 |
| | fc0.1 | | | | |
| | fc0.2 | | | | |
| | fc1.0 | C1 | 1 | | |
| | fc1.1 | | | | |
| | fc1.2 | | | | |
| | fc2.0 | C2 | 2 | | |
| | fc2.1 | | | | |
| | fc2.2 | | | | |

| Bug ID | Stack ID | Features | | | Label |
|---|---|---|---|---|---|
| B1 | cs1 | 2 | 2.16 | 1.8 | 1.2 | 2 |
| B2 | cs2 | 0 | 7.9 | 3.4 | 2.3 | 1 |
| ... | ... | ... | ... | ... | ... | ... |

CRASH BUG COMPONENT PREDICTION SYSTEM TO IDENTIFY COMPONENTS AS POTENTIAL BUG SOURCES

BACKGROUND

Software development includes a process of debugging, in which errors in source code are identified and removed. Modern software systems have increasingly large and complicated source code, which results in an increasing number of bugs that are to be identified and removed. To facilitate debugging, a crash reporting system is deployed to automatically gather crash reports from testing, delivery, and end users (customers) that are generated in response to crashing of the software. In general, a software crash can be described as a condition, in which the software stops functioning properly.

Crash reports contain information that is representative of execution of the software system and context of a crash of the software system. Crash reports can be reviewed in an effort to identify a source of a bug that caused the crash. For example, a component of the software can be identified as the likely source of the root cause. Based on this, the bug can be assigned to a particular development team, which may be most likely to provide resolution. For example, a crash report management system can be provided, which can be used to assign bugs to development teams for handling. In some examples, a ticket is opened in the crash report management system to track resolution of the crash (e.g., debugging of the bug).

SUMMARY

Implementations of the present disclosure are directed to identifying components of software systems as bug components that are root causes of crashes reported in one or more crash reports. More particularly, implementations of the present disclosure are directed to a crash bug component prediction (CBCP) system that processes crash reports using one or more machine learning (ML) models to predict components of software systems as bug components that are likely root causes of crashes reported in respective crash reports. The bug components can be assigned to development teams for mitigation of root causes.

In some implementations, actions include receiving a crash report provided as a computer-readable file, providing a stack trace from the crash report, adding component information to the stack trace, for each component identified in the stack trace, determining a set of features, processing sets of features through a ML model to provide a prediction identifying a component as a bug component, and assigning the bug component for resolution through a crash management system. Other implementations of this aspect include corresponding systems, apparatus, and computer programs, configured to perform the actions of the methods, encoded on computer storage devices.

These and other implementations can each optionally include one or more of the following features: the prediction is a component position within the stack trace; a set of features of a respective component includes at least one feature determined based on a function of the respective component; the at least one feature includes an inverse document frequency (IDF) value determined for the function; the component information includes, for each component, component name and location, and the component information is added using a component map stored in computer-readable memory; the ML model is trained using training data including, for each stack trace in a set of historical stack traces, a set of features and a label, the set of features corresponding to a component labeled as a bug component for the respective stack trace; and providing a stack trace from the crash report comprises generating a stack trace table comprising functional serial numbers and function names listed in the stack trace of the crash report.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to identifying components of software systems as bug components that are root causes of crashes reported in one or more crash reports. More particularly, implementations of the present disclosure are directed to a crash bug component prediction (CBCP) system that processes crash reports using one or more machine learning (ML) models to predict components of software systems as bug components that are likely root causes of crashes reported in respective crash reports. The bug components can be assigned to development teams for mitigation of root causes.

Implementations can include actions of receiving a crash report provided as a computer-readable file, providing a stack trace from the crash report, adding component information to the stack trace, for each component identified in the stack trace, determining a set of features, processing sets of features through a ML model to provide a prediction identifying a component as a bug component, and assigning the bug component for resolution through a crash management system.

To provide further context for implementations of the present disclosure, and as introduced above, software development includes a process of debugging, in which errors in source code are identified and removed. Modern software systems have increasingly large and complicated source code, which results in an increasing number of bugs that are to be identified and removed. To facilitate debugging, a crash reporting system is deployed to automatically gather crash reports from testing, delivery, and end users (customers) that are generated in response to crashing of the software. In general, a software crash can be described as a condition, in which the software stops functioning properly.

Typically, crash reports contain information on the environment (e.g., device, operating system), system status, call stack trace, and execution. In some examples, a call stack trace, also referred to as stack trace herein, can be described as a control flow of the software. In a crash report, a stack trace represents a control flow leading up to a crash. A control flow can include an order of functions that were executed leading up to a crash. A stack trace alone can provide sufficient information for developers to have a starting point of where to look for the root cause of a crash. That is, experience can inform that a particular component of the software is the likely source of the root cause. Based on this, the bug can be assigned to a particular development team, which may be most likely to provide resolution. For example, a crash report management system can be provided, which can be used to assign bugs to development teams for handling. In some examples, a ticket is opened in the crash report management system to track resolution of the crash (e.g., debugging of the bug).

However, manually finding the root cause of a crash can be difficult. For example, root cause analysis can require deep knowledge and understanding of the source code. Consequently, bugs are frequently assigned to incorrect development teams, which results in resubmission and reassignment of bugs. This process of resubmission and reassignment is inefficient in both time and resources including technical resources (e.g., processors, memory) in crash management systems. Moreover, incorrect assignments can be compounded (e.g., multiple instances of incorrect assignment of a bug), which results in compounded inefficiencies in crash management systems. Further, incorrect assignments delay resolution of the bugs.

In view of the above context, implementations of the present disclosure provide a CBCP system that processes crash reports to identify components as bug components that are likely root causes of crashes reported in respective crash reports. As described in further detail herein, a stack trace is extracted from a crash report, a set of features is extracted from the stack trace, and the set of features is processed using one or more ML models to provide a prediction. The prediction indicates one or more components (e.g., of a software system underlying the crash report) as bug components that are the likely source of the crash. The bug components can be assigned to development teams through a crash management system for mitigation of root causes.

Figure 1:
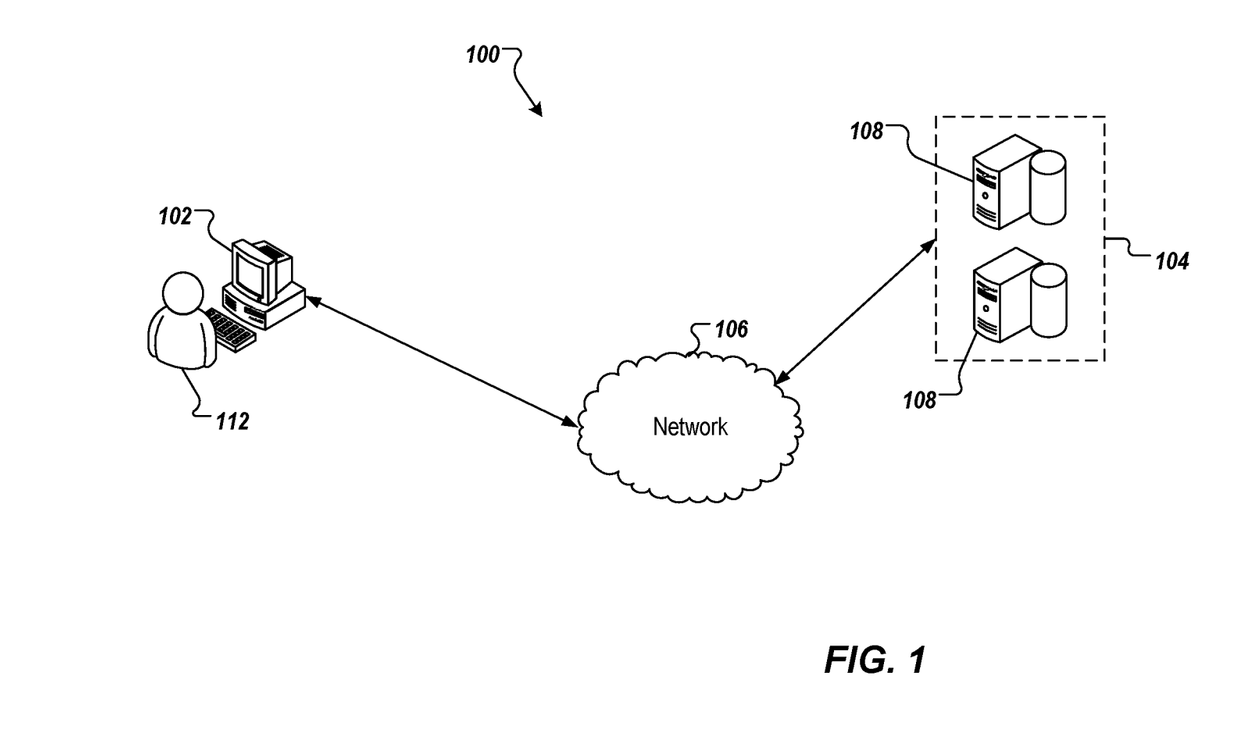
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, and as noted above, the server system 104 can host a CBCP system of the present disclosure. In some examples, the server system 104 receives a set of crash reports that is processed using the CBCP system to time- and resource-efficiently identify one or more software components as likely sources of the bug and assign the bug to one or more development teams that are appropriate for the one or more software components. For example, a development team that is responsible for development of the source code underlying the one or more software components.

Figure 2:
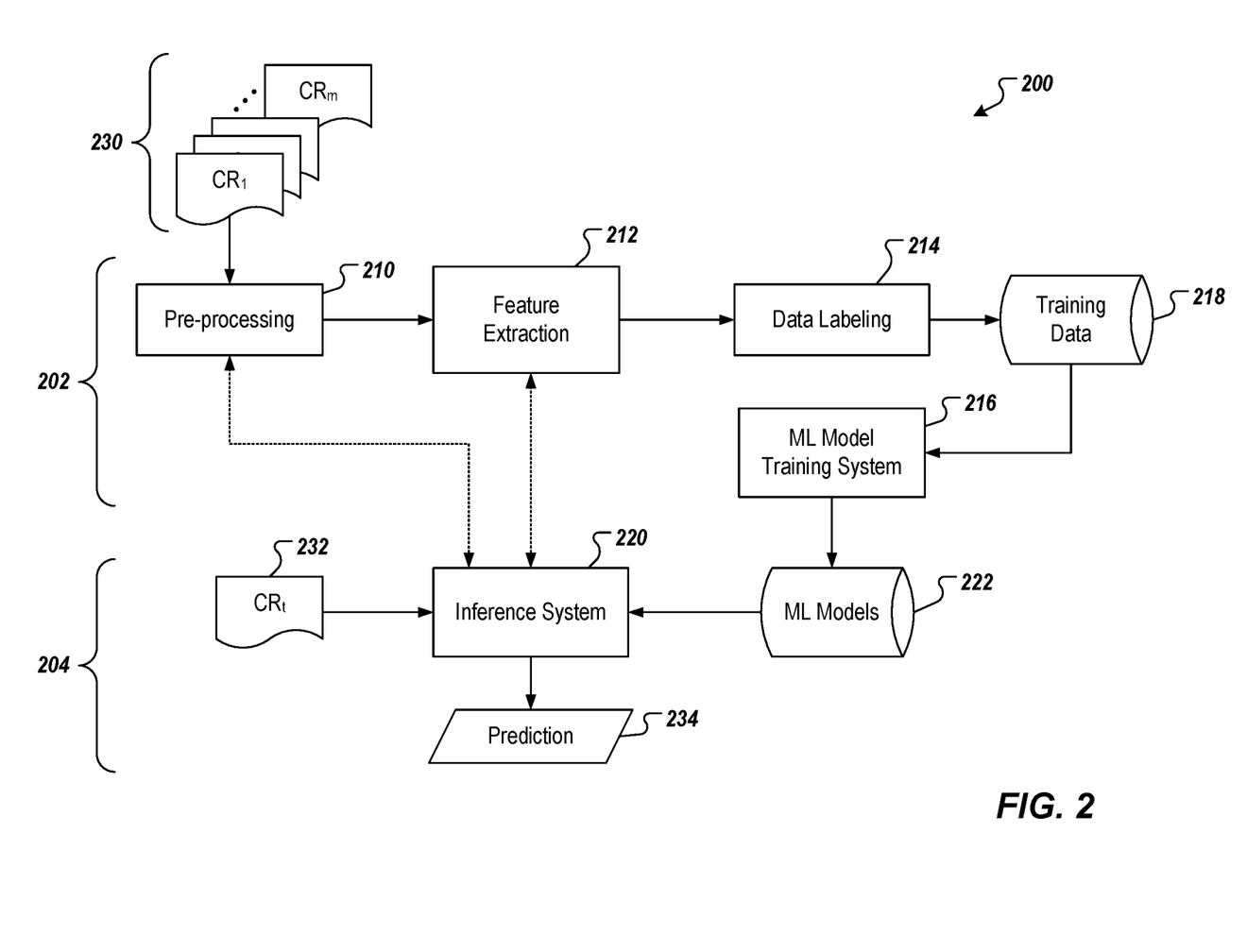
FIG. 2 depicts a conceptual architecture of a component identification system in accordance with implementations of the present disclosure.

FIG. 2 depicts a conceptual architecture of a CBCP system 200 in accordance with implementations of the present disclosure. In the example of FIG. 2, the CBCP system 200 can be referenced in terms of a training phase 202 and an inference phase 204. In some examples, and as described in further detail herein, a set of ML models is trained during the training phase 202 and one or more ML models in the set of ML models can be used to provide predictions during the inference phase 204.

In the example of FIG. 2, the CBCP system 200 includes a pre-processing module 210, a feature extraction module 212, a data labeling module 214, a ML model training system 216, and a training data store 218, which are used in the training phase 202. The CBCP system 200 also includes an inference system 220 and a ML model store 222. As described in further detail herein, during training, the CBCP system 200 receives a set of crash reports 230 and provides training data based on the set of crash reports, the training data being used to train a set of ML models. As also described in further detail herein, the CBCP system 200 receives a crash report 232 and provides a prediction 234 based on the crash report 232.

With regard to training, the set of crash reports 230 represent historical crashes of a software system. As such, each crash report in the set of crash reports 230 can be associated with a bug of a set of bugs, each bug having a unique identifier assigned thereto (e.g., B1, B2, . . . ). Further, each crash report in the set of crash reports 230 can be associated with a component that was determined to be the source of the bug. That is, the component that the bug was determined to occur in.

Figure 3:
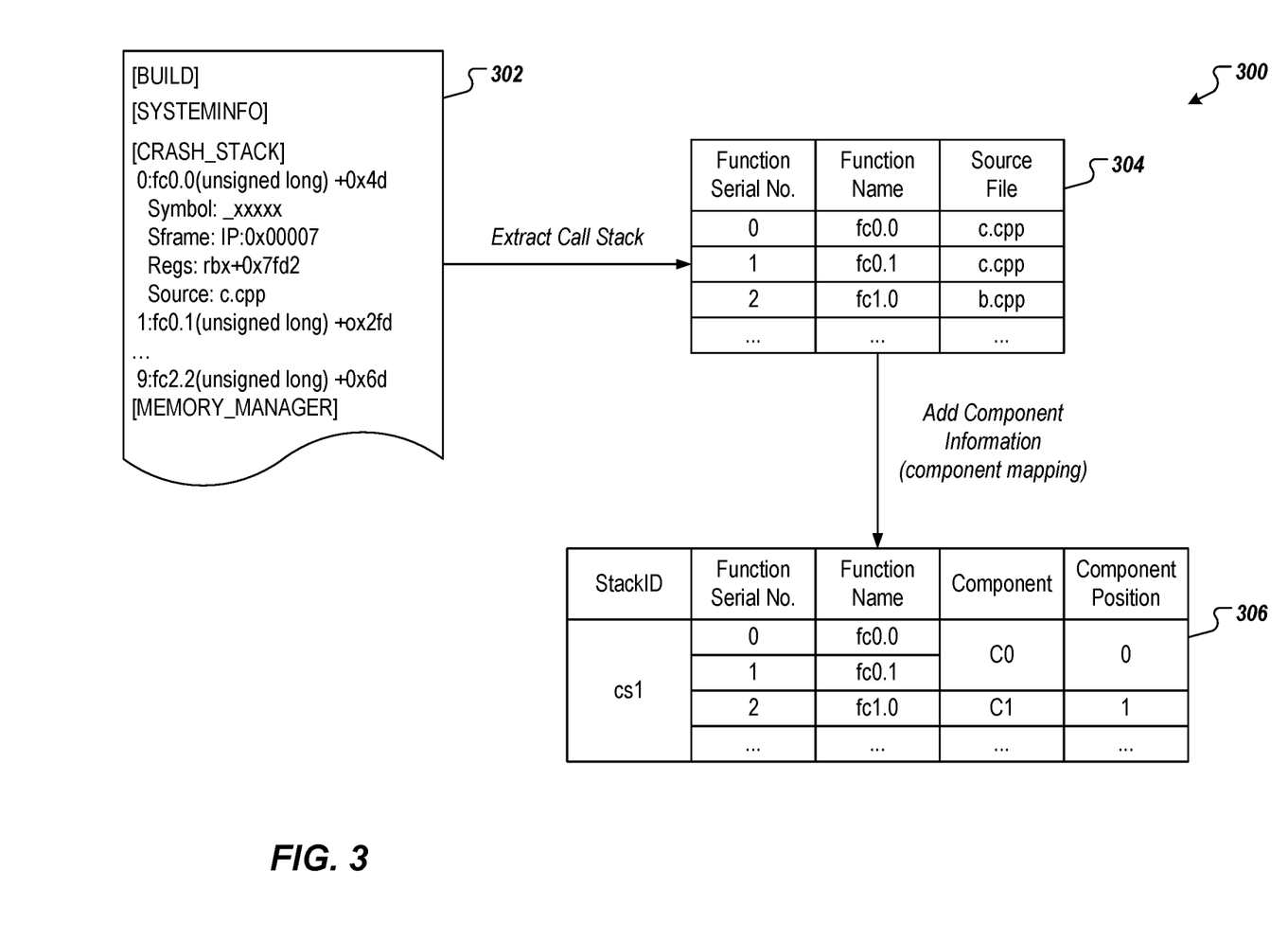
FIG. 3 depicts a representation of pre-processing of crash reports in accordance with implementations of the present disclosure.

In some implementations, each crash report in the set of crash reports 230 is processed by the pre-processing module 210 to extract a stack trace and to provide component information based on the stack trace. FIG. 3 depicts a representation of pre-processing 300 of crash reports in accordance with implementations of the present disclosure. In the example of FIG. 3, an example crash report 302 is depicted. In general, crash reports contain a multitude of information representative of a respective crash of a software system. In some examples, crash reports, such as the example crash report 302 of FIG. 3, include information describing a state of the software at the time of a crash to assist developers in eventually fixing a bug that resulted in the crash. In some examples, [HEADER] information includes general information such as the process identifier (PID) of the crashing process and the time of crash, and other information includes [BUILD] information, [CRASH_STACK] information, [CPUINFO] information, and [MEMORY_MANAGER] information. The content of the call stack is provided in the [CRASH_STACK] as a stack trace, which can also be referred to as an exception.

In some implementations, the stack trace is identified from the [CRASH_STACK] and information is extracted to a stack trace table 304. In some examples, the stack trace includes function names with parameter values, function identifiers (e.g., function serial numbers), symbols, sframes, regs, and source files. The pre-processing module 210 can remove information that is not useful and retain, for example, function identifiers, function names (without parameter values), and source files. In some examples, the stack trace is associated with a unique identifier (e.g., cs1) that uniquely identifies the stack trace among stack traces of other crash reports. The stack trace can be processed using one or more rules that determine a function serial number for each function listed in the stack trace, the name of each function, and a source file that the function is provided in (e.g., the source file that contains the source code of the function. This information is used to populate a stack trace table, as represented with the stack trace table 304 of FIG. 3, which can be provided for a stack trace having a stack identifier (Stack ID) of cs1.

In some implementations, component information is added to the stack trace table 304 to provide a stack trace and component table 306. As depicted in the example of FIG. 3, the component information can include a component identifier (e.g., C0, C1, . . . ) that uniquely identifies a respective component, and a component position. In some examples, the component position is the sequence number (e.g., starting from zero) of each component name in the call stack. In some examples, if the component names of sequential functions are the same, the same component position is set for the component name of the sequential functions in sequence. For example, in FIG. 3, the functions fc0.0 and fc0.1 are sequential functions, thus the component name is C0 for both, as well as their component position of 0.

In some examples, a component map can be maintained for the software system (e.g., a cmakelist file), which maps each function of the software system to a component of the software system. In this manner, it can be determined which component a function is coded within. In some examples, for each function in the stack trace, the function name is used to index the component map and identify the component that the function is provided in. In some examples, the component map also maps source code files to components. In this manner, it can be determined, which source code file components are provided within.

Figure 4:
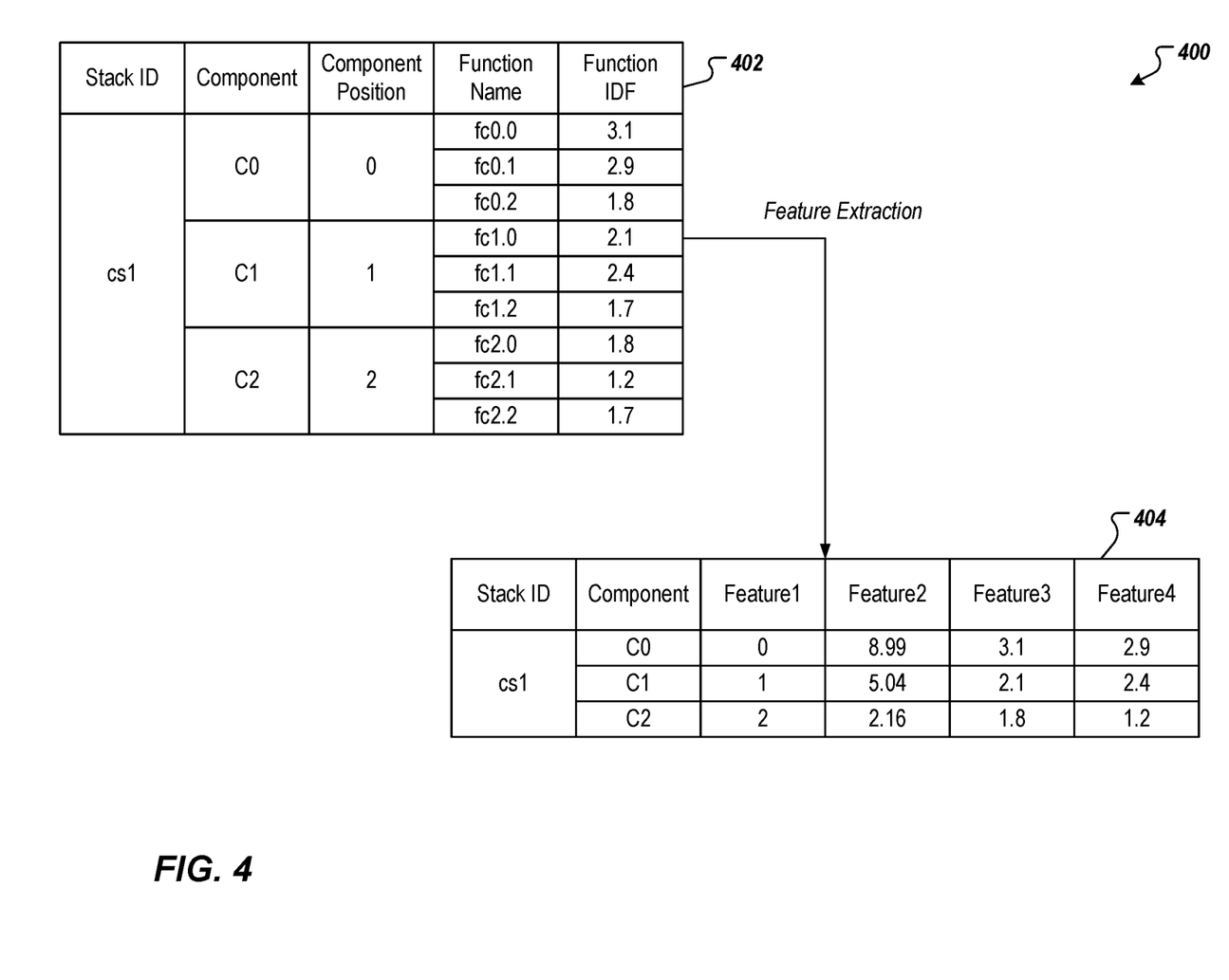
FIG. 4 depicts a representation of feature extraction in accordance with implementations of the present disclosure.

In some implementations, the stack trace and component table is processed by the feature extraction module 212 to provide a set of features for each component included in the stack trace. FIG. 4 depicts a representation of feature extraction 400 in accordance with implementations of the present disclosure. In some examples, for each function, an inverse document frequency (IDF) is determined and is associated with its respective function in the stack trace and component table. The example of FIG. 4 includes a stack trace and component table 402 that includes IDF values for each function.

In general, IDF can be described as a measure of how common (or rare) a term is in a given document corpus. In the context of the present disclosure, IDF is a measure of how common (or rare) functions are with respect to a crash corpus (e.g., the set of crash reports 230). Here, it is noted that common functions of stack traces are not related to the root causes of crashes, because they appear in most stack traces. Instead, more rare functions of low probability of components are unusual, which may indicate root cause components. In some implementations, the following relationship is provided to determine the IDF of a function:

$$IDF_f = \log\frac{\text{count}(C) + 1}{\text{count}(f) + 1}$$

Here, count(C) is the number of stack traces in the crash corpus that have the components determined for the stack trace being considered, and count (f) is the number of stack traces in the crash corpus that have the function being considered. For example, and with reference to FIG. 4, an IDF of the function fc0.0 is determined based on the number of stack traces in the crash corpus that have the components C0, C1, and C2, and the number of stack traces in the crash corpus that have the function fc0.0.

In some implementations, a set of features is provided for each component to provide a component feature table, such as a component feature table 404 depicted in FIG. 4. In some examples, each set of features is at least partially based on the IDFs of functions of the respective component. In some examples, the set of features includes the component position (feature 1), a product of IDFs of a first function and a second function (feature 2), the IDF of the first function (feature 3), and the IDF of the second function (feature 4). In the example of FIG. 4, the second feature is calculated as the product of 3.1 and 2.9, which is 8.99. It has been determined that a sub-set of functions (e.g., the first two functions of each component) can be used for feature extraction (e.g., as opposed to all functions) to provide an acceptable accuracy in predictions during inference. In this manner, acceptable accuracy is achieved while reducing the number of calculations (e.g., as compared to feature extraction based on all functions), thereby conserving technical resources. While a set of features including four features is discussed herein, it is contemplated that the set of features can include any appropriate number of features.

Referring again to FIG. 2, the data labeling module 214 can be used to label to each stack trace. In some examples, the label is the component position of the component that was determined to be the bug component (source of the bug) for the respective stack trace. Here, it can be noted that the component position is relatively stable. That is, it has been statistically determined that a vast majority (e.g., up to 96%) of root cause components (bug components) are in the top five component positions of call stacks. It can also be noted that bug components are often in the first few components (e.g., first five component) of preprocessed stack traces. Using the component name as a label can create problems. For example, for a previously unseen bug and resulting crash, if a new component of a stack trace is not in the labels of training dataset, the resulting ML model has a higher likelihood of incorrectly predicting the bug component. This can be mitigated by using component position as the label. For example, regardless of how many "new" components that are not represented in the training data, the component position of the preprocessed stack trace is limited.

Figure 5:
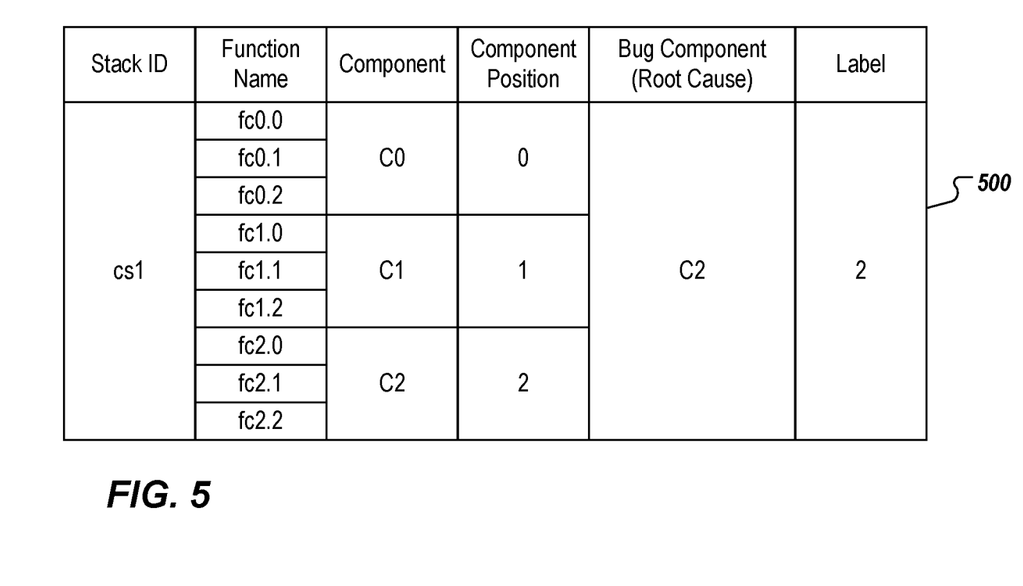
FIG. 5 depicts a representation of labeling in accordance with implementations of the present disclosure.

FIG. 5 depicts a representation of labeling in accordance with implementations of the present disclosure. In the example of FIG. 5, a stack trace and component table 500 is depicted with a label assigned to the stack trace being considered. Here, the historical data provides that the component C2 was the bug component resulting in the respective crash. Consequently, the stack trace is labeled as 2, which is the component position of the component C2.

Figure 6:
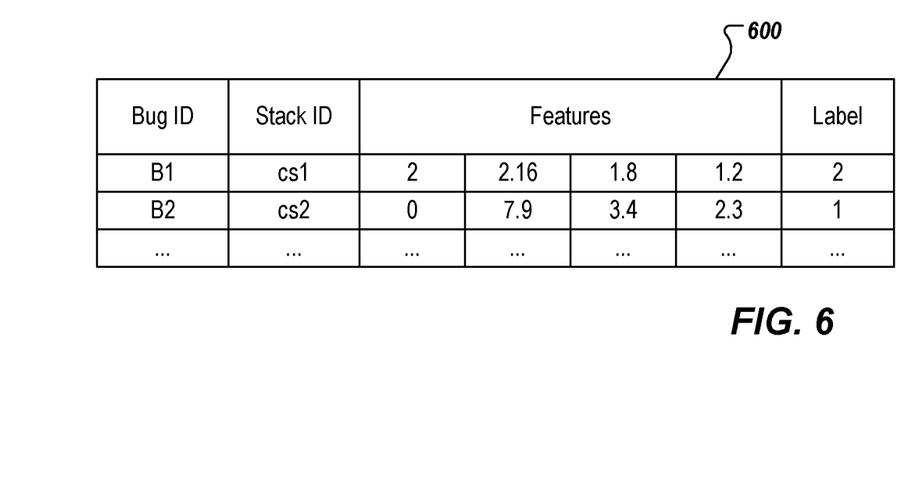
FIG. 6 depicts a representation of training data in accordance with implementations of the present disclosure.

In some implementations, training data is provided, which includes a collection of stack information, features, and labels for respective bugs. In some examples, the training data is stored in the training data store 218. FIG. 6 depicts a representation of training data 600 in accordance with implementations of the present disclosure. In the example of FIG. 6, the training data includes a bug identifier that uniquely identifies a bug that had been determined from the set of crash reports (e.g., the set of crash reports 230 of FIG. 2), a stack identifier of a respective stack trace, a set of features for the stack trace, and a label assigned to the stack trace. In some examples, the set of features in the training data is provided as the set of features of the bug component determined for the respective stack trace. For example, the set of features of cs1 is provided as the set of features of component C2 (e.g., [2, 2.16, 1.8, 1.2]).

With regard to inference, the training data is used to train a set of ML models. In some examples, the set of ML models includes disparate types of ML models. Example types of ML models can include, without limitation, a random forest (RF) model, a decision tree (DT) model, a multilayer perceptron (MLP) model, and a long short-term memory (LSTM) model). In general, each ML model is iteratively trained, where, during an iteration, one or more parameters of the ML model are adjusted, and an output is generated based on the training data. For each iteration, a loss value is determined based on a loss function. The loss value represents a degree of accuracy of the output of the ML model. In some examples, if the loss value does not meet an expected value (e.g., is not equal to zero), parameters of the ML model are adjusted in another iteration of training. In some instances, this process is repeated until the loss value meets the expected value.

In some implementations, an accuracy of each ML model in the set of ML models is determined. For example, a portion of the training data can be withheld from training of the ML models, then used to validate the ML models. For example, stack traces in the withheld portion of training data can be processed through each ML model and an accuracy value can be determined (e.g., as a ratio of bug components correctly identified to total number of stack traces). In some examples, a ML model having a highest accuracy is selected. For example, it can be determined that the RF model has the highest accuracy and, as a result, is selected for use in inference. The ML model is stored in the ML model store 222.

In some implementations, parameters of the ML model can be tuned. In some examples, parameters of the ML model can be tuned using a system for finding the optimal parameter values from a given set of parameters in a grid, such as GridSearchCV. The ML model, with optimized parameters, is used for inference.

Referring again to FIG. 2, the inference system 220 can load the ML model 222 from the ML model store. The inference system 220 receives the crash report 232 and pre-processes the crash report to provide a stack trace and add component information. This can be performed by the pre-processing module 210 (e.g., the inference system 220 sending a request to the pre-processing module 210) or can be performed by a pre-processing module that is internal to the inference system 220. The pre-processing of the crash report 232 is the same as described herein with reference to FIG. 3. The inference system 220 extracts features for components of the stack trace provided from the crash report 232. This can be performed by the feature extraction module 212 (e.g., the inference system 220 sending a request to the feature extraction module 212) or can be performed by a feature extraction module that is internal to the inference system 220. The feature extraction of the crash report 232 is the same as described herein with reference to FIG. 4. In some examples, the crash corpus for feature extraction during inference includes all crash reports in the database system.

During inference, the sets of features of the components of the stack trace of the crash report 232 are processed by the ML model, which outputs the prediction 234. The prediction 234 is a component position that is determined to be the component that is the bug component. For example, if the prediction 234 is 2, then the component in component position 2 is the bug component. The bug components can be assigned to a development team through a crash management system for mitigation of root causes. In some examples, mitigation of root causes can include the development team determining a root cause of the bug within the bug component and taking a corrective action (e.g., deploy a patch to resolve the bug).

Figure 7A:
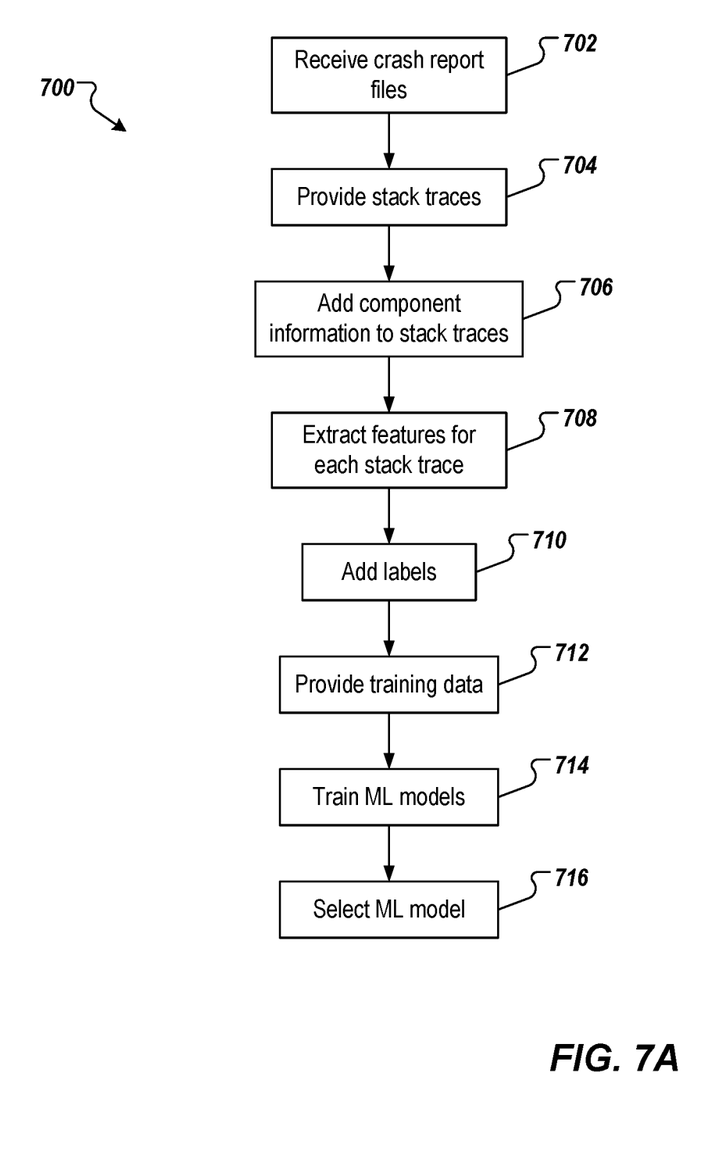
FIGS. 7A and 7B depict example processes that can be executed in accordance with implementations of the present disclosure.
Figure 7B:
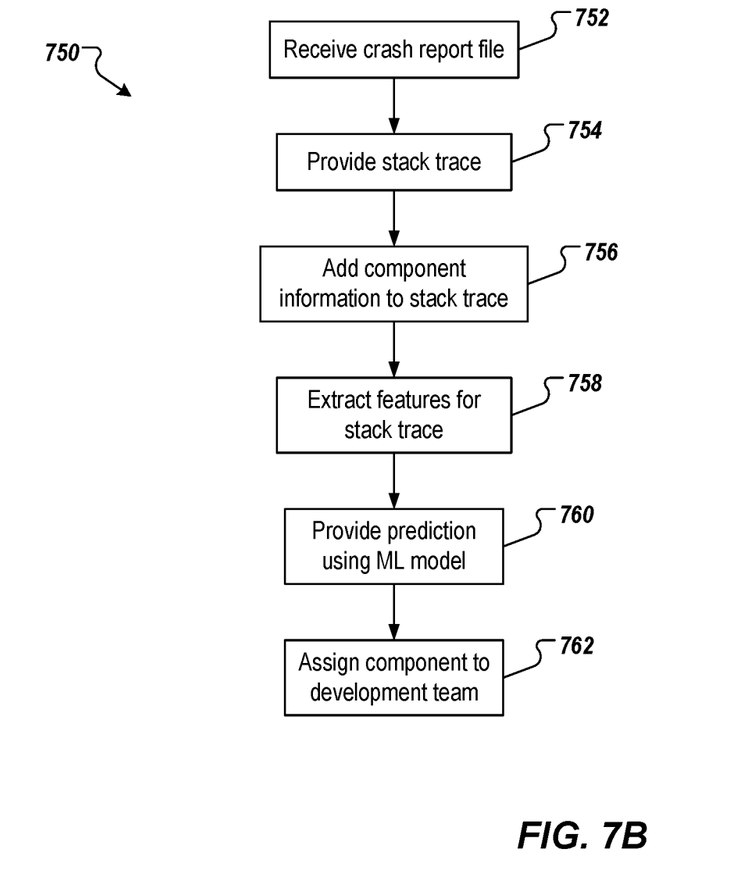

FIGS. 7A and 7B depict example processes 700, 750, respectively, that can be executed in accordance with implementations of the present disclosure. In some examples, the example processes 700, 750 are each provided using one or more computer-executable programs executed by one or more computing devices. The process 700 can be executed during a training phase and the process 750 can be executed during an inference phase.

With particular reference to FIG. 7A, crash report files are received (702). For example, and as described herein with reference to FIG. 2, the set of crash reports 230 can be received by the pre-processing module 210 and represent historical crashes of a software system. In some examples, each crash report is provided as a computer-readable file. Stack traces are provided (704). For example, and as described herein, each crash report in the set of crash reports 230 is processed by the pre-processing module 210 to extract a stack trace to a stack trace table. Component information is added to the stack traces (706). For example, and as described herein, the pre-processing module 210 adds component information to the stack trace table using a component map based on function names included in the stack trace.

A set of features is extracted for each stack trace (708). For example, and as described herein, the feature extraction module 212 processes the stack trace and component information to provide, for each component, a set of features. In some examples, the set of features includes at least one feature determined based on a function of the respective component. For example, the at least one feature includes an IDF value determined for the function. A label is added to each stack trace (710). For example, and as described herein, each stack trace is labeled with a component position of the component that had been the source of the bug of the crash represented by the stack trace. Training data is provided (712). For example, and as described herein, training data includes, for each stack trace, a set of features and a label.

A set of ML models is trained (714) and a ML model is selected (716). For example, and as described herein, the set of ML models includes disparate types of ML models. Each ML model can be trained using the training data. An accuracy of each ML model in the set of ML models is determined. In some examples, a ML model having a highest accuracy is selected for use during inference.

With particular reference to FIG. 7B, a crash report is received (752). For example, and as described herein, the inference system 220 can received the crash report 232. In some examples, the crash report is provided as a computer-readable file. In some examples, the crash report is provided from a computing device executing a software system that experienced a crash of the software system. A stack trace is provided (754). For example, and as described herein, the crash report 232 is processed (e.g., by the pre-processing module 210) to extract a stack trace to a stack trace table. Component information is added to the stack trace (756). For example, and as described herein, component information is added to the stack trace table (e.g., by the pre-processing module 210) using a component map based on function names included in the stack trace.

A set of features is extracted for the stack trace (758). For example, and as described herein, the stack trace and component information are processed (e.g., by the feature extraction module 212) to provide, for each component, a set of features. A prediction is provided from a ML model (760). For example, and as described herein, sets of features of the components of the stack trace of the crash report 232 are processed by the ML model, which outputs the prediction 234 as a component position that is determined to be the component that is the bug component. The component is assigned to a development team (762). For example, and as described herein, the bug components can be assigned to a development team through a crash management system for mitigation of root causes. In some examples, mitigation of root causes can include the development team determining a root cause of the bug within the bug component and taking a corrective action (e.g., deploy a patch to resolve the bug).

Figure 8:
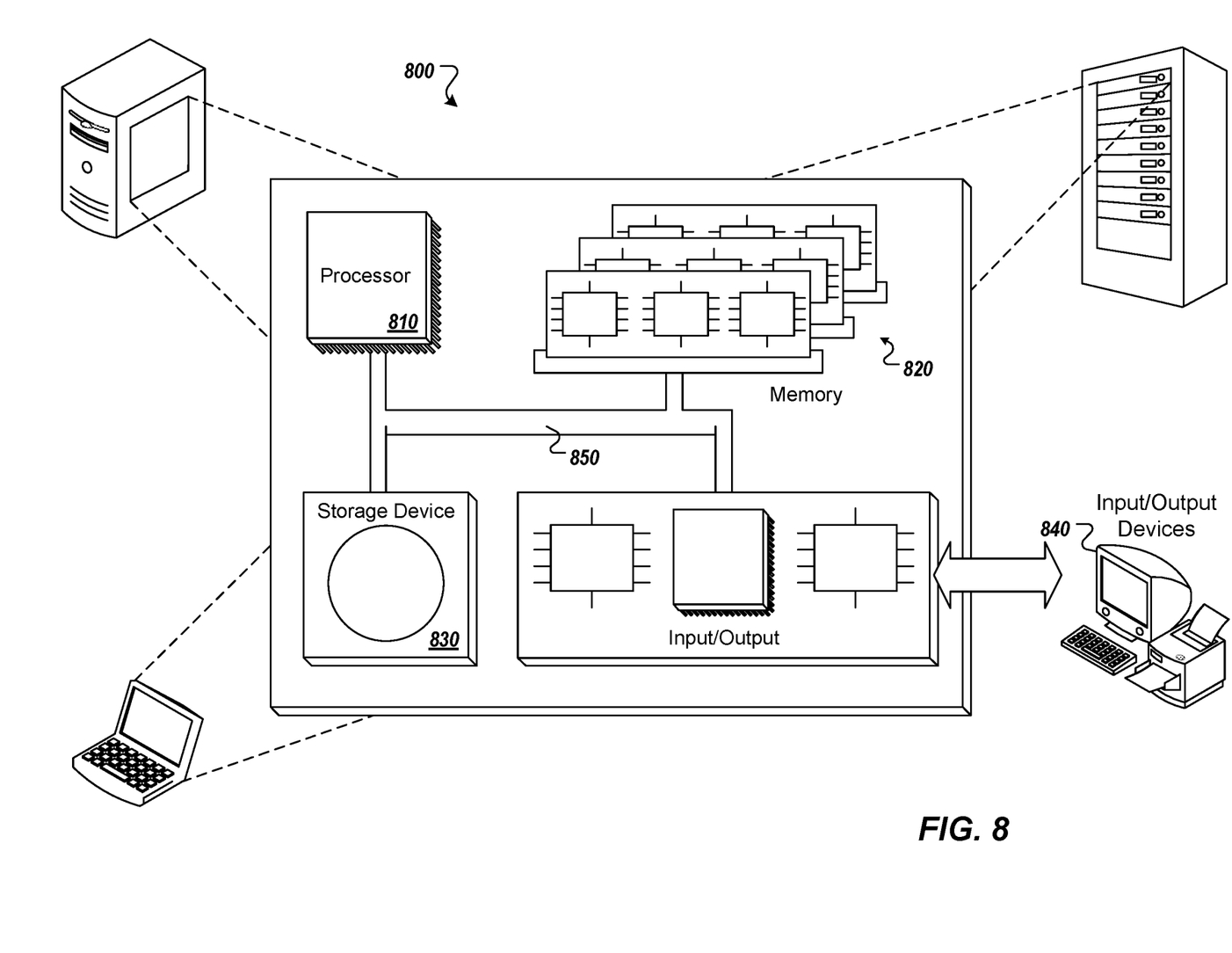
FIG. 8 is a schematic illustration of example computer systems that can be used to execute implementations of the present disclosure.

Referring now to FIG. 8, a schematic diagram of an example computing system 800 is provided. The system 800 can be used for the operations described in association with the implementations described herein. For example, the system 800 may be included in any or all of the server components discussed herein. The system 800 includes a processor 810, a memory 820, a storage device 830, and an input/output device 840. The components 810, 820, 830, 840 are interconnected using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830 to display graphical information for a user interface on the input/output device 840.

The memory 820 stores information within the system 800. In some implementations, the memory 820 is a computer-readable medium. In some implementations, the memory 820 is a volatile memory unit. In some implementations, the memory 820 is a non-volatile memory unit. The storage device 830 is capable of providing mass storage for the system 800. In some implementations, the storage device 830 is a computer-readable medium. In some implementations, the storage device 830 may be a floppy disk device, a hard disk device, an optical disk device, or a tape device. The input/output device 840 provides input/output operations for the system 800. In some implementations, the input/output device 840 includes a keyboard and/or pointing device. In some implementations, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for identifying components in crash reports generated in response to crashes of software systems, the method being executed by one or more processors and comprising:
    receiving a crash report provided as a computer-readable file;
    providing a stack trace from the crash report;
    adding component information to the stack trace to provide a stack trace and component table comprising a component column populated with a set of the components, a component position column populated with a set of component positions, each component in the set of components being associated with a respective component position in the set of component positions, a function name column populated with a set of function names, each component in the set of the components being associated with a sub-set of function names, and a function value column populated with a set of function values, each component being associated with a sub-set of function values;
    for each component identified in the stack trace, determining a set of features;
    processing sets of features through a machine learning (ML) model to provide a prediction identifying a component of the set of the components as a bug component, the ML model having been trained using training data comprising, for each stack trace in a set of historical stack traces, a set of historical features and a label, the set of historical features corresponding to a bug component for the respective stack trace; and
    assigning the bug component for resolution through a crash management system.

2. The method of claim 1, wherein the prediction comprises a component position within the stack trace.

3. The method of claim 1, wherein the set of features of a respective component comprises at least one feature determined based on the sub-set of function values of the respective component.

4. The method of claim 1, wherein each function value in the set of function values comprises an inverse document frequency (IDF) value determined for a respective function, the IDF value indicating a relative commonality of the respective function within a set of crash reports.

5. The method of claim 1, wherein the component information comprises, for each component, component name and location, and the component information is added using a component map stored in computer-readable memory.

6. The method of claim 1, wherein providing the stack trace from the crash report comprises generating a stack trace table comprising functional serial numbers and function names listed in the stack trace of the crash report.

7. A non-transitory computer-readable storage medium coupled to one or more processors and having instructions stored thereon which, when executed by the one or more processors, cause the one or more processors to perform operations for identifying components in crash reports generated in response to crashes of software systems, the operations comprising:
    receiving a crash report provided as a computer-readable file;
    providing a stack trace from the crash report;
    adding component information to the stack trace to provide a stack trace and component table comprising a component column populated with a set of the components, a component position column populated with a set of component positions, each component in the set of components being associated with a respective component position in the set of component positions, a function name column populated with a set of function names, each component in the set of the components being associated with a sub-set of function names, and a function value column populated with a set of function values, each component being associated with a sub-set of function values;
    for each component identified in the stack trace, determining a set of features;
    processing sets of features through a machine learning (ML) model to provide a prediction identifying a component of the set of the components as a bug component, the ML model having been trained using training data comprising, for each stack trace in a set of historical stack traces, a set of historical features and a label, the set of historical features corresponding to a bug component for the respective stack trace; and
    assigning the bug component for resolution through a crash management system.

8. The non-transitory computer-readable storage medium of claim 7, wherein the prediction comprises a component position within the stack trace.

9. The non-transitory computer-readable storage medium of claim 7, wherein the set of features of a respective component comprises at least one feature determined based on the sub-set of function values of the respective component.

10. The non-transitory computer-readable storage medium of claim 9, wherein each function value in the set of function values comprises an inverse document frequency (IDF) value determined for a respective function, the IDF value indicating a relative commonality of the respective function within a set of crash reports.

11. The non-transitory computer-readable storage medium of claim 7, wherein the component information comprises, for each component, component name and location, and the component information is added using a component map stored in computer-readable memory.

12. The non-transitory computer-readable storage medium of claim 7, wherein providing the stack trace from the crash report comprises generating a stack trace table comprising functional serial numbers and function names listed in the stack trace of the crash report.

13. A system, comprising:
a computing device; and
a computer-readable storage device coupled to the computing device and having instructions stored thereon which, when executed by the computing device, cause the computing device to perform operations for identifying components in crash reports generated in response to crashes of software systems, the operations comprising:
receiving a crash report provided as a computer-readable file;
providing a stack trace from the crash report;
adding component information to the stack trace to provide a stack trace and component table comprising a component column populated with a set of the components, a component position column populated with a set of component positions, each component in the set of components being associated with a respective component position in the set of component positions, a function name column populated with a set of function names, each component in the set of the components being associated with a sub-set of function names, and a function value column populated with a set of function values, each component being associated with a sub-set of function values;
for each component identified in the stack trace, determining a set of features;
processing sets of features through a machine learning (ML) model to provide a prediction identifying a component of the set of the components as a bug component, the ML model having been trained using training data comprising, for each stack trace in a set of historical stack traces, a set of historical features and a label, the set of historical features corresponding to a bug component for the respective stack trace; and
assigning the bug component for resolution through a crash management system.

14. The system of claim 13, wherein the prediction comprises a component position within the stack trace.

15. The system of claim 13, wherein the set of features of a respective component comprises at least one feature determined based on the sub-set of function values of the respective component.

16. The system of claim 15, wherein each function value in the set of function values comprises an inverse document frequency (IDF) value determined for a respective function, the IDF value indicating a relative commonality of the respective function within a set of crash reports.

17. The system of claim 13, wherein the component information comprises, for each component, component name and location, and the component information is added using a component map stored in computer-readable memory.

* * * * *